(12) United States Patent
McBrien et al.

(10) Patent No.: US 6,917,455 B2
(45) Date of Patent: Jul. 12, 2005

(54) CASCADED RZ AND NRZ LASER MODULATORS HAVING RZ/NRZ PHASE ALIGNMENT BIAS CONTROL

(75) Inventors: Gregory J. McBrien, Glastonbury, CT (US); Joseph Farina, Southwick, MA (US); John D. Borla, West Hartford, CT (US)

(73) Assignee: JDS Uniphase Corporation, San Jose, CA (US)

( * ) Notice: Subject to any disclaimer, the term of this patent is extended or adjusted under 35 U.S.C. 154(b) by 78 days.

(21) Appl. No.: 10/423,825

(22) Filed: Apr. 25, 2003

(65) Prior Publication Data

US 2004/0008395 A1 Jan. 15, 2004

Related U.S. Application Data

(63) Continuation-in-part of application No. 09/990,872, filed on Nov. 16, 2001, now abandoned.
(60) Provisional application No. 60/252,480, filed on Nov. 22, 2000.

(51) Int. Cl.[7] ................................................. G02F 1/03
(52) U.S. Cl. ......................... 359/238; 359/239; 359/248
(58) Field of Search ................................. 359/238, 239, 359/245, 248, 279, 242, 241; 375/242, 241

(56) References Cited

U.S. PATENT DOCUMENTS

| | | | | |
|---|---|---|---|---|
| 5,148,503 | A | 9/1992 | Skeie | 385/3 |
| 5,168,534 | A | 12/1992 | McBrien et al. | 385/3 |
| 5,249,243 | A | 9/1993 | Skeie | 385/3 |
| 5,400,417 | A | 3/1995 | Allie et al. | 385/2 |
| 5,835,212 | A | 11/1998 | Kissa et al. | 356/345 |
| 6,341,031 | B1 | 1/2002 | McBrien et al. | 359/237 |
| 6,404,819 | B1 * | 6/2002 | Gehlot | 375/242 |
| 2001/0009469 | A1 * | 7/2001 | Shimizu et al. | 359/187 |

* cited by examiner

*Primary Examiner*—Timothy Thompson
(74) *Attorney, Agent, or Firm*—Allen, Dyer, Doppelt, Milbrath & Gilchrist, P.A.

(57) ABSTRACT

An optical transmitter architecture has a return-to-zero (RZ) laser modulator coupled in cascade with a non-return-to-zero (NRZ) laser modulator. Modulator bias and electronic phase delay bias are controlled using dither-based feedback, so as to align the phase of the RZ clock signal with that of the NRZ data. A first method uses an RZ quadrature AM dither or an RZ "hillclimber" bias dither, to apply a relatively low frequency dither signal to a variable RF delay for the RZ clock signal applied to the RZ modulator or NRZ data signal applied to the NRZ modulator. A second method is an RZ quadrature AM dither or "hillclimber" bias dither scheme that applies equal amplitude and opposite phase dither signals to perform complementary modulation of both the RZ and NRZ MZ modulators simultaneously.

17 Claims, 4 Drawing Sheets

CASCADED RZ AND NRZ LASER MODULATORS HAVING RZ/NRZ PHASE ALIGNMENT BIAS CONTROL

CROSS-REFERENCE TO RELATED APPLICATION

The present application is a continuation-in-part of U.S. application Ser. No. 09/990,872, filed Nov. 16, 2001 now abandoned, by G. McBrien et al, entitled: "Cascaded Rz and Nrz Laser Modulators Having RZ/NRZ Phase Alignment Bias Control," and also claims the benefit of co-pending U.S. application Ser. No. 60/252,480, filed Nov. 22, 2000, by G. McBrien, et al, entitled: "RZ/NRZ Phase Alignment Bias Control," each application being assigned to the assignee of the present application and the disclosures of which are incorporated herein.

FIELD OF THE INVENTION

The present invention relates in general to optical (e.g., laser-based) communication systems and components therefor, and is particularly directed to a new and improved digital optical transmitter architecture having a return-to-zero (RZ) external modulator coupled in cascade with a non-return-to-zero (NRZ) external modulator, and wherein the DC bias and modulation signal drive levels of the two modulators are controlled using dither-based feedback, to control the bias points of the modulators, as well as to align the phase of the RZ signal with that of the NRZ data.

BACKGROUND OF THE INVENTION

Return-to-zero (RZ) and short pulse (quasi-soliton) type data formats are currently receiving increased attention from optical telecommunication system designers, because of their inherent advantage over non-return-to-zero (NRZ) formats in a number of high bit rate, laser-based communication applications, such as those operating at very high data rates (e.g., on the order of ten to several tens of Gb/s or higher). For example, RZ (and RZ-type) data formats have been shown to allow increased peak power transmission over extended span lengths by minimizing the effects of chromatic dispersion.

Although an NRZ optical transmitter typically employs only a single electro-optic modulator, the hardware for implementing an RZ external transmitter (such as for long haul, high bit rate fiber communications) is more complex, as it may require two cascaded electro-optic modulators— one for RZ signals, the other for NRZ signals. For proper transmitter operation, in addition to the separate bias control for the RZ and NRZ modulators, there must be some way of maintaining phase alignment between the RZ and NRZ signals, irrespective of changes in ambient operational parameters, e.g., aging and temperature.

SUMMARY OF THE INVENTION

In accordance with the present invention, this objective is successfully achieved by means of dither signal-based feedback bias control mechanism, that controls DC bias and relative delay of the modulation signals to the two modulators, so as to align the phase of the RZ signal with that of the NRZ data. As will be described, the invention may be implemented using one of several techniques employing the same feedback control to align the RZ clock and the NRZ data. The first technique method applies a relatively low frequency (e.g., 10 kHz) dither signal to a variable RF delay in series with the electrical signals applied to the RZ or NRZ modulators. The second technique applies equal amplitude and opposite phase dither signals to perform complementary amplitude modulation of both the RZ and NRZ MZ modulators simultaneously.

The RZ optical transmitter itself may comprise a pair of cascaded Mach Zehnder (MZ) modulators to produce the desired RZ-formatted digital data stream. The upstream RZ clock modulator is used as a pulse generator to create a series of ones that return to zero within the bit time period. The downstream NRZ modulator is used to gate the RZ clock pulse train on and off with an NRZ data stream. An advantage of this embodiment is that the order of the RZ modulator and the NRZ modulator may be reversed, and control is implemented by monitoring the signal at the end of the chain. When the centers of the RZ clock pulses are aligned with the centers of the NRZ data, the result is the desired optical RZ data signal. The invention employs low frequency modulation and feedback control, to align the electrical phase of the RZ clock to the phase of the NRZ data.

The first technique may be implemented using either an RZ quadrature phase dither or an RZ hillclimber phase dither. In the quadrature phase dither implementation, the RZ modulator is biased at its transfer function half power point, resulting in an RZ duty cycle of 50%. This larger duty cycle may be preferred where wider RZ pulses are desired. In the hillclimber phase dither implementation, the RZ modulator is biased at the peak point of its transfer function, to realize an RZ duty cycle of 33%. This somewhat smaller duty cycle of the second embodiment produces a pulse shape that mitigates the effects of chromatic dispersion, and makes it attractive for longer range applications.

In either the quadrature or hillclimber implementation of the first technique, the front end of a modulator bias control circuit extracts a portion of the modulated optical beam, by means of high speed photodetector followed by an RF detector having a bandwidth sufficient to detect half the bit rate frequency. The RF detector produces a DC voltage proportional to detected RF power. The phase dither imparted by the variable RF delay on the RZ clock or NRZ data is converted to a slightly varying power level of the detected RF signal. The DC voltage produced by the RF detector includes the fundamental low frequency dither signal, when the phase of the RZ and NRZ waveforms are not aligned. The output of the RF detector is coupled to a downstream amplifier and bandpass filter centered on the fundamental of the (10 kHz) dither signal. The filtered and amplified signal is then coupled to a synchronous demodulator.

If the fundamental dither signal is present, the synchronous demodulator produces an error signal that is added to or subtracted from a bias output voltage via an integrator. This bias voltage is used to control an electrical phase delay in the RZ or NRZ signal path. When the RF clock and RF data are aligned in phase, detected RF power is maximized and the detected fundamental dither signal is minimized, so that there will be no error signal present at the output of the synchronous demodulator.

The second technique is implemented using an RZ quadrature phase dither. A low frequency modulation (dither) signal with low modulation index is used to amplitude modulate the two RF signals needed to create optical RZ data. These RF signals are converted to optical signals by the MZ modulators. The two dither signals are produced such that the resultant phases of the two optical dither signals are 180 degrees out of phase and of equal amplitude.

An optical tap coupler followed by a reduced cost, low frequency photodetector, amplifiers and bandpass filters centered on the fundamental of the dither signal are used to convert the optical dither signals to the electrical domain. The filtered and amplified signal is then presented to a synchronous demodulator.

If the fundamental dither signal is present, the synchronous demodulator produces an error signal. When the RZ clock and NRZ data are aligned in phase, the two dither signals of equal amplitude and opposite phase will cancel and there will be no error signal present at the output of the synchronous demodulator. If there is phase misalignment between the RZ and the NRZ data, then the optical dither amplitudes at the output of the cascaded modulators will not be of the same amplitude and will not cancel. An error signal will be added to or subtracted from a bias output voltage via an integrator circuit. This bias voltage is used to control an electrical phase delay imparted to the RZ or NRZ RF signal.

DETAILED DESCRIPTION

Figure 1:
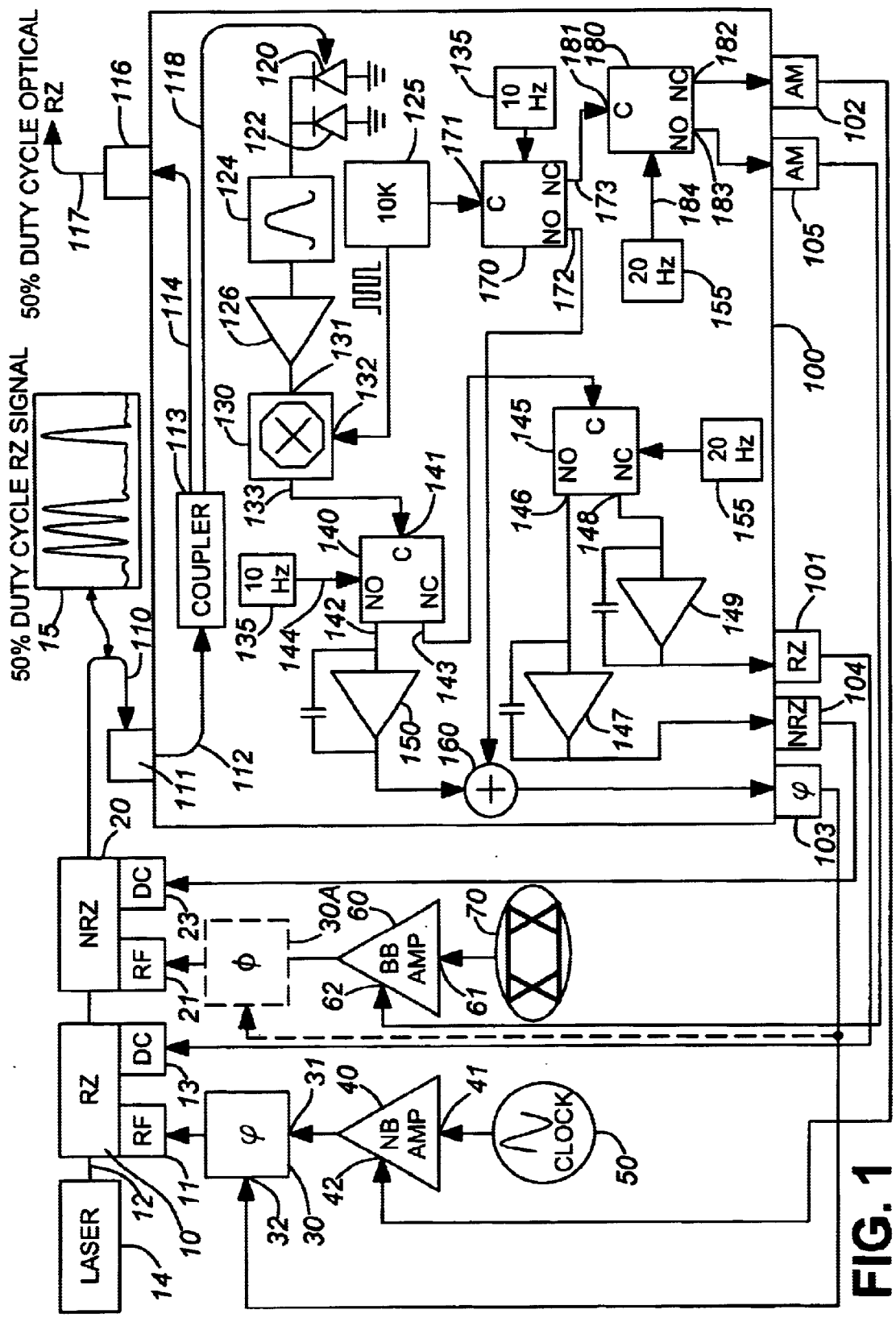
FIG. 1 diagrammatically illustrates a first embodiment of the cascaded RZ/NRZ digital optical transmitter of the present invention, which employs quadrature bias control of the RZ and NRZ modulators, as well as phase alignment of the RZ and NRZ signals.

A first embodiment of the cascaded RZ/NRZ digital optical transmitter of the present invention, which employs RZ quadrature bias control and phase alignment of the RZ and NRZ RF signals applied to respective RZ and NRZ modulators is diagrammatically shown in FIG. 1. In this embodiment, the RZ modulator is biased at its transfer function half power point, resulting in an RZ duty cycle of 50%. This larger duty cycle may be preferred in applications where wider RZ pulses are desired.

Regardless of the biasing control mechanism used, the modulator architecture of each embodiment of the invention comprises a pair of external modulators 10 and 20, which are optically cascaded in the output beam path 12 of a continuous wave laser 14, so as to produce the desired RZ-modulated digital data stream. As a non-limiting example, each of modulators 10 and 20 may comprise an X-cut lithium niobate (LN) Mach Zehnder (MZ) modulator. The relatively upstream modulator 10 serves to modulate the CW laser with a sinusoidal input applied to its RF signal drive port 11. These optical RZ pulses can be considered as a series of 'ones' that return to 'zero' within the bit time period. The relatively downstream cascaded modulator 20 is used to gate the RZ pulses produced by the modulator 10, on and off, in accordance with a broadband NRZ digital data signal applied to the downstream modulator's RF signal drive port 21 (as shown graphically at 15). As noted previously, the order of the modulators may be reversed.

In accordance with the RZ quadrature embodiment of FIG. 1, when the centers of the RZ clock pulses imparted to the upstream RZ modulator 10 are aligned with the centers of the NRZ data signal imparted to the downstream NRZ modulator 20, CW the laser output 12 will be properly modulated with the desired optical RZ data stream. This mutual RZ/NRZ alignment is achieved through a feedback-based, phase dithering mechanism employed by a modulator bias control circuit 100, to be described.

As further shown in FIG. 1, the upstream RZ modulator 10 has its RF drive signal port 11 coupled to receive a narrowband sinusoidal drive signal, and a DC bias port 13 coupled to receive a DC bias voltage supplied from an RZ DC bias output port 101 of a modulator bias control circuit 100. In addition to performing RZ quadrature phase alignment of the two (RZ and NRZ) signals, the modulator bias control circuit 100 employs a feedback path from the modulator's optical output to control the respective DC bias voltages for each modulator, so as to sustain long-term, stable operation of the external modulators, compensating for environmental effects, such as temperature and aging (which is especially important for telecom and datacom applications).

The sinusoidal drive signal applied to the RF drive signal port 11 of the upstream modulator 10 is delayed by a voltage-controlled phase shifter 30 installed in the output path of a narrowband amplifier 40. As a non-limiting example, the phase shifter 30 may provide a variable 0°–360° phase shift to an (RZ) clock signal 50 applied to input 41 of the narrow band amplifier over a voltage control range of 0–10 volts applied to a phase shift control input 32. The narrowband amplifier 40 has an input port 41 coupled to receive a (sinusoidal) clock signal output by a high frequency clock generator 50. As a non-limiting example, the high frequency clock generator 50 may generate a 10 GHz sine wave (associated with the 10 Gbps bit rate of an OC-192 data stream).

An amplitude control port 42 of the narrowband amplifier 40 is coupled to receive the relatively low frequency (e.g., 10 kHz), amplitude-modulating dither signal output from an RZ AM dither port 102 of the modulator bias control circuit 100. The phase control port 32 of the phase shifter 30 is coupled to receive a control voltage, which includes the 10 kHz dither signal plus a DC phase delay voltage, the magnitude of which depends upon whether the RZ and NRZ signals are mutually aligned (as will be described), from an RZ phase control port 103 of the modulator bias control circuit 100.

The NRZ modulator 20 has its RF drive signal port 21 coupled to receive a broadband NRZ data signal, and a DC bias port 23 coupled to receive a DC bias voltage from an NRZ DC bias output port 104 of the modulator bias control circuit 100. The broadband NRZ data signal applied to the RF port 21 of the NRZ modulator 20 is derived from a broadband amplifier 60, which has an input port 61 coupled to receive a digital data stream from an NRZ digital data source 70. Like the narrowband amplifier 40 for the RZ modulator, the NRZ broadband amplifier 60 has an amplitude control port 62 thereof coupled to receive a relatively low frequency (e.g., 10 kHz), amplitude-modulating dither signal from an NRZ AM dither port 105 of modulator bias control circuit 100.

As described briefly above, the modulator bias control circuit 100 employs low frequency AM and phase dither modulation and feedback control to achieve modulator bias and phase alignment between the two respective RF (RZ and NRZ) signals that modulate the CW laser power 12 via cascaded MZ modulators 10 and 20. The two RF signals to be aligned are the RZ clock pulse train applied by the phase shifter 30 to the RF signal drive port 11 of the RZ modulator 10, and the NRZ (gating) data signal applied to the signal drive port 21 of NRZ modulator 20. When the centers of the RZ clock pulses are aligned with the centers of the NRZ data, the CW laser output 12 will be modulated with the desired optical RZ data stream.

In accordance with the first embodiment of the invention, the modulator bias control circuit 100 imparts differential phase control between the two modulators' RF inputs 11 and 21 by using a relatively low frequency (e.g., 10 kHz) dither signal to control a variable RF delay or phase shift imparted to the RZ clock applied to the RF signal input port 11 of the upstream RZ modulator 10. This phase shift dither is converted to a small amount of low frequency jitter on the RZ optical waveform and a slightly varying power level of the RF signal detected by the RF detector 122 within the bias control circuit 100, which is effective to bring the RZ clock signal into center alignment with the NRZ data signal.

For this purpose, the modulator bias control circuit 100 has an optical signal extraction front end coupled to monitor the composite RZ/NRZ-modulated laser output from the downstream NRZ modulator 20. A fiber optic input port 111, to which an optical fiber 110 transporting the RZ/NRZ-modulated laser from the NRZ modulator 20 is coupled, is connected via a section of optical fiber 112 to an optical coupler 113. A section of optical fiber 114 connects the optical coupler 113 to an optical output port 116, from which almost all (e.g., on the order of 98%) of the modulated light is transported (as by way of an output optical fiber 117).

Also coupled to the optical coupler 113 is a further section of optical fiber 118, which couples a relatively small fraction (e.g., on the order of 2%) of the RZ/NRZ-modulated light to a high speed optical detector 120 (such as one capable of one-half the bit rate frequency or more). The output of the high speed optical detector 120 is coupled to an RF detector 122. For the above-referenced OC-192 bit rate (on the order of 10 Gbps), the RF detector may have a bandwidth on the order of 5–6 GHz, and may comprise a tunnel diode, Schottky diode or a similar device, that produces a DC voltage proportional to the RF power applied to its input. In the present embodiment, the DC voltage output of the RF detector 122 contains the fundamental of the low frequency (e.g., 10 kHz) dither signal when the phase of the RZ and NRZ waveforms are not aligned.

The output of the RF detector 122 is coupled through a bandpass filter 124 and amplifier 126 to a first input 131 of a synchronous demodulator 130. The passband characteristic of the bandpass filter 124 is centered about the (10 kHz) dithering frequency, so that the first input 131 of synchronous demodulator 130 is representative of dithering modulation as detected by the RF detector 122. A second input 132 of the synchronous demodulator 130 is coupled to receive the actual 10 kHz dithering signal generated by the (10 kHz) clock generator 125. The amplitude of the dithering signal itself is preferably relatively low (e.g., on the order of 100 mV peak-to-peak) relative to the voltage range (e.g., 0–10 volts) of phase shifter 30.

Figure 2:
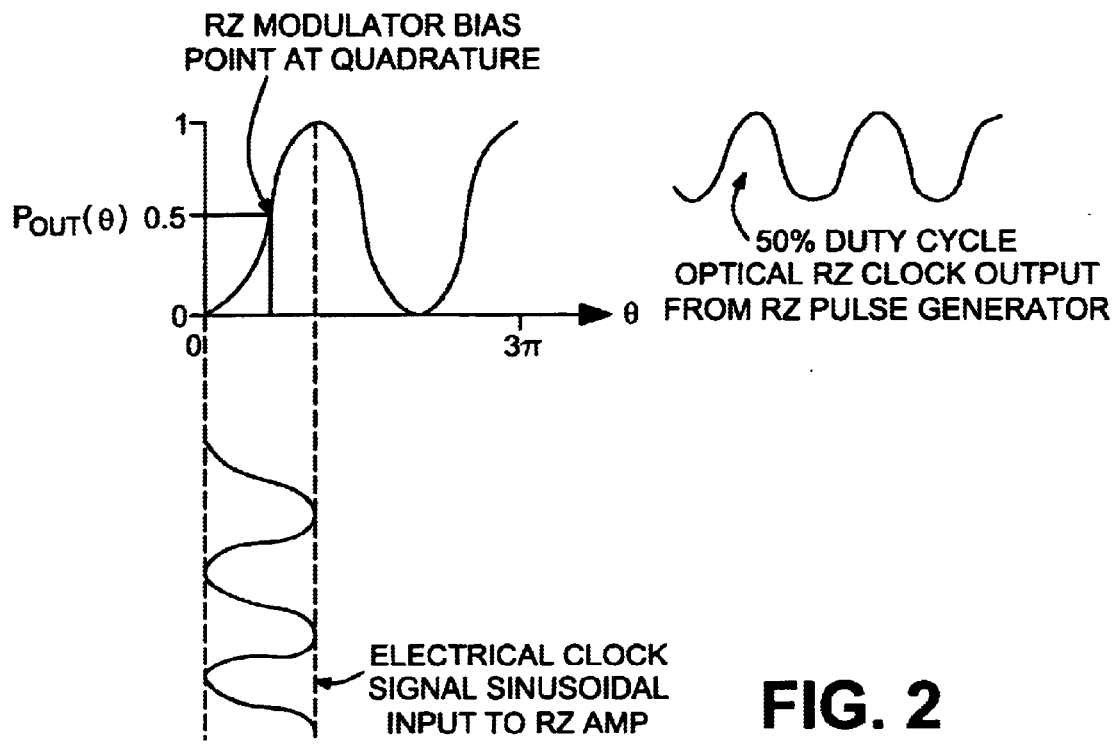
FIG. 2 is a transfer function diagram associated with FIG. 1, showing the pulse generator modulator is biased at the half power point to produce 50% duty cycle RZ pulses.

In the present RZ quadrature bias embodiment, the RZ modulator is biased at the half power point, as diagrammatically shown in the transfer function diagram of FIG. 2, so that when the RF (RZ) clock and RF (NRZ) data are aligned in phase, the RF power detected by the RF detector 122 will be maximized and the fundamental of the detected dither signal minimized, resulting in no error signal at the output of the synchronous demodulator 130. However, if the fundamental (10 kHz) dither signal is present in the output of the RF detector 122, the output of the synchronous demodulator 130 will be a non-zero error voltage, representing misalignment between the RZ and NRZ signals.

For the RZ quadrature bias embodiment shown in FIG. 1, this error voltage is integrated by integrator 150 and is fed back to the control input 32 of the phase shifter 30 in the RZ signal path to adjust the location of the centers of the RZ pulses relative to those of the NRZ signal. As an equivalent alternative, the phase shifter may comprise a broadband phase shift component installed in the output path from the NRZ broadband amplifiers to the RF drive signal input to the NRZ modulator, as shown in broken lines 30A. Moreover, rather than use a single device, the phase shifter may be implemented as separate narrowband and broadband phase shift elements, installed in the output paths of the amplifiers 40 and 60, respectively. The choice of implementation depends upon the designer and application. What is required is that the phase shift mechanism be capable of providing a controllable differential phase offset between the RZ and NRZ RF signals in accordance with the detected error derived by the modulator bias control circuit 100.

In order to derive the DC error voltage used to control the differential phase shift, the output 133 of the synchronous demodulator 130 is coupled to an input 141 of a first, toggled, detected error-coupling switch 140. The connection path through switch 140 is toggled periodically at a relatively slow rate (on the order of 10 Hz) between first and second outputs 142 and 143, by means of a very low frequency switching control signal 135 applied to switch control port 144. The switching signal for this and other toggled switches 145, 170 and 180 within the modulator bias control circuit 100 may be sourced from a supervisory micro-controller, or generated by a separate clock signal generator, such as that shown at 135. These toggled switches are used to periodically update, at a relatively slow rate (e.g., on the order of ten to several tens of Hertz), the DC control voltages applied to the DC bias control inputs to the RZ and NRZ modulators and the phase control voltage applied to the phase shifter 30.

The first output 142 of the detected DC error-coupling switch 140 is used to control the amount of phase shift (if any) to be imparted to the clock signal driving the RZ modulator 10. In addition, the DC error is used to adjust the DC bias voltages for the two modulators. For the former purpose, the switch output 142 is coupled directly to a first DC error integrator 150, while the second output 143 of switch 140 is coupled to second and third DC error integrators 147 and 149, respectively, by means of a second periodically toggled, DC bias-control switch 145.

The output of each integrator is a DC voltage that is representative of the error signals generated by the synchronous detector 130 associated with misalignment between the RZ and NRZ signals or modulator bias offset of the respective RZ and NRZ modulators. This DC voltage as accumulated by the integrator 150 is summed in an adder 160 with a (10 kHz) dither signal provided at a first output 172 of a third, toggled dither signal-coupling switch 170, which may be toggled at the same (10 Hz rate) used to toggle the detected DC error-coupling switch 140. Thus, the output of adder 160 is the (10 kHz) dither signal riding on the DC voltage produced by the integrator 150. This summation signal is coupled to the RZ phase control port 103 and is used to control the electrical phase delay of the RZ RF signal imparted by phase shifter 30.

The DC bias-control switch 145 has a first output 146 coupled to integrator 147, the output of which is coupled to the NRZ DC bias output port 104 of the modulator bias control circuit 100. The DC bias-control switch 145 also has a second output 148 coupled to integrator 149, the output of which is coupled to the RZ DC bias output port 101 of the modulator bias control circuit 100. Toggling between the respective outputs 146 and 148 of the DC bias-control switch 145 is controlled by a second, relatively low switching frequency signal on the order of twice that used to toggle switch 140 (e.g., 20 Hz, as it is used to update the DC bias voltage for each modulator), and may be sourced from a microcontroller, or by a separate clock generator 155.

The dither signal-coupling switch 170 has its input 171 coupled to receive the (10 kHz) dithering signal output of the (10 kHz) clock generator 125, and a second output 173 coupled to the input 181 of a fourth, periodically toggled dither signal-coupling switch 180. A first output 182 of the switch 180 is coupled to RZ AM dither port 102, while a second output 183 is coupled to NRZ AM dither port 105. Switch 180 is used to alternately couple the RF amplitude-modulating dithering signal to each of the RZ narrowband amplifier 40 and the NRZ broadband amplifier 60. Similar to the toggling of DC bias-control switch 145, since switch 180 is used to toggle the dither signal between the two amplifiers 40 and 60, its toggle control input 184 is coupled to receive the higher of the two relatively low switching frequency signals (e.g., 20 Hz).

Figure 4:
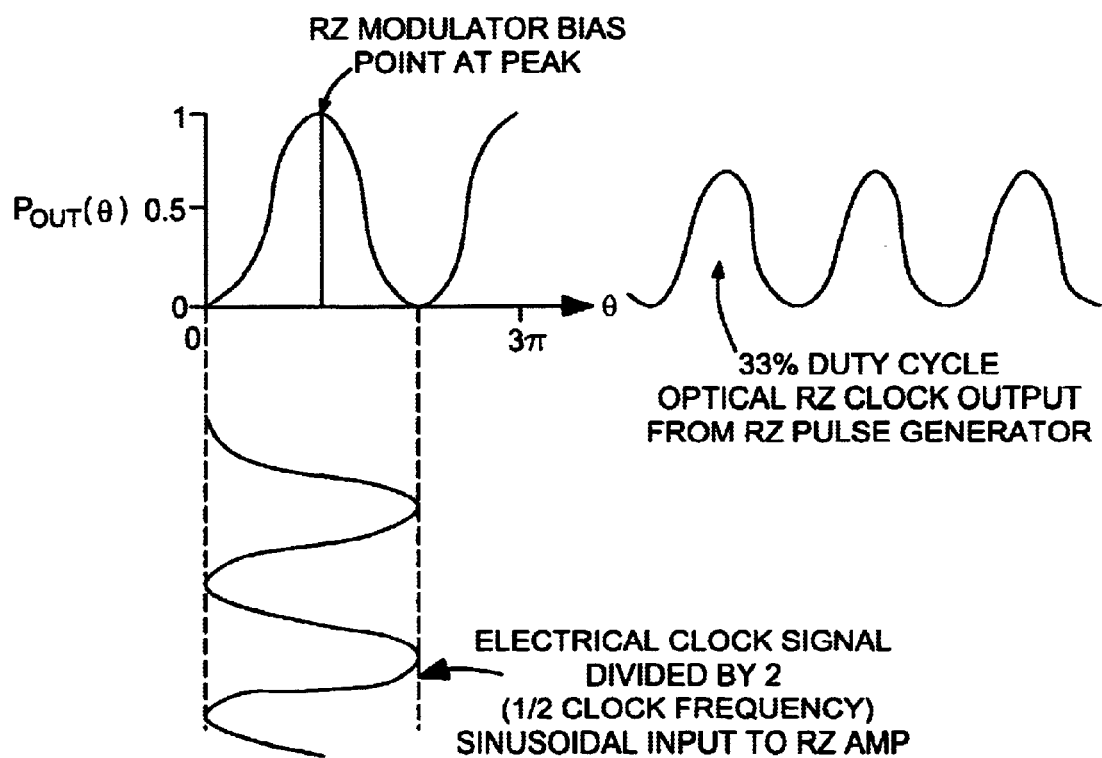
FIG. 4 is a transfer function diagram associated with FIG. 3, showing the RZ modulator is biased at its peak power point.
Figure 3:
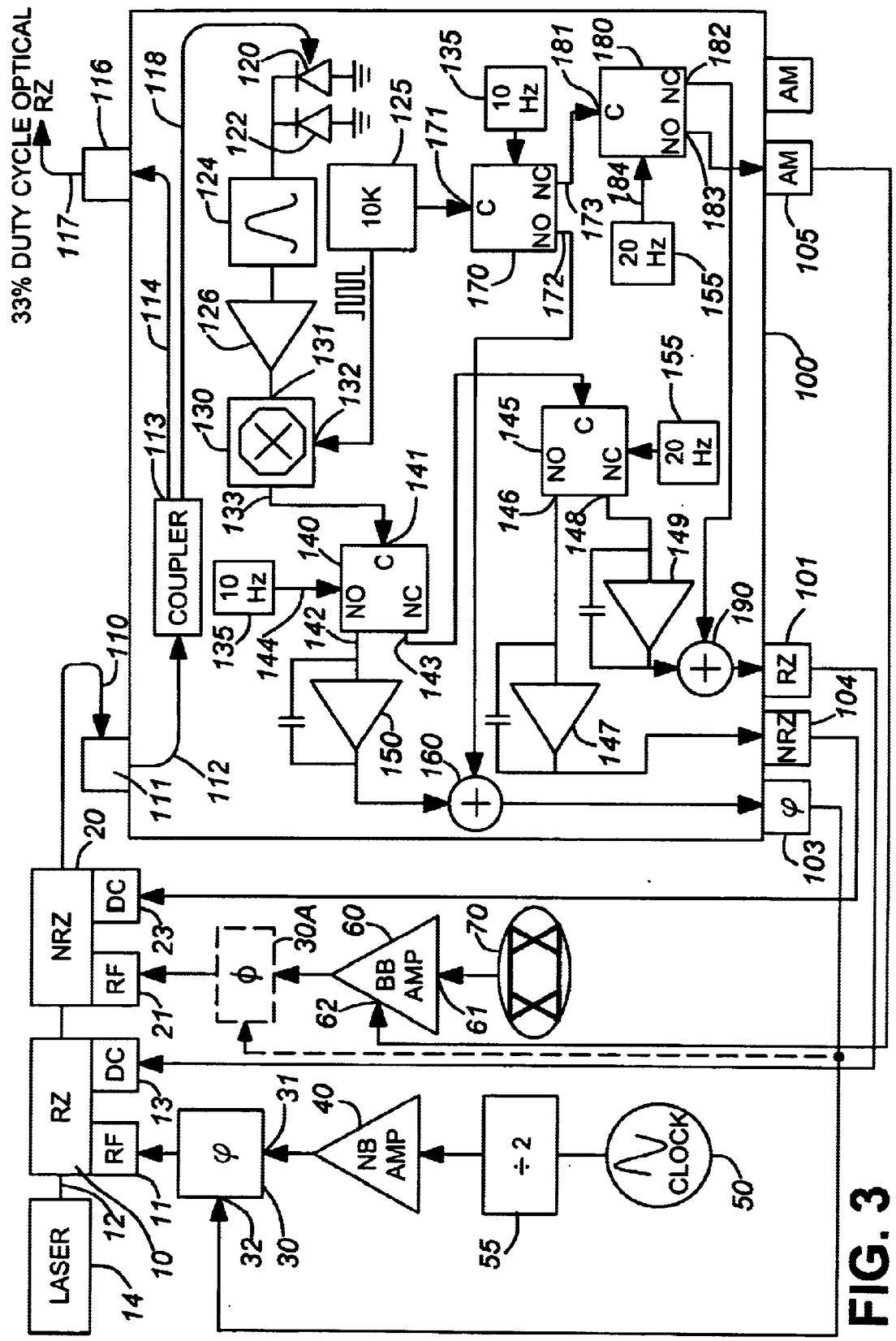
FIG. 3 diagrammatically illustrates a second embodiment of the cascaded RZ/NRZ digital optical transmitter of the present invention, which employs a hillclimber phase to bias the RZ pulse generator to the peak for 33% duty cycle RZ, and dither to control the differential phase between the RZ and NRZ RF signals applied to respective RZ and NRZ modulators.

FIG. 3 diagrammatically illustrates a second embodiment of the cascaded RZ/NRZ digital optical transmitter of the present invention, which employs a "hillclimber" bias control to bias the RZ modulator to the peak of its transfer function and phase dither to control the differential phase between the RZ and NRZ RF signals applied to respective RZ and NRZ modulators. In this embodiment, the RZ modulator is biased at the peak point of its transfer function, as shown in FIG. 4, so as to realize an RZ duty cycle of 33%. This somewhat smaller duty cycle of the second embodiment increases the spacing between pulses, which may make it attractive for longer range applications.

Since, for the most part, the architecture of the embodiment of FIG. 3 is essentially the same as that of the embodiment of FIG. 1, like components of the two embodiments will not be redescribed here. The architecture of FIG. 3 differs from FIG. 1 in the following respects. First, the frequency of clock generator 50 is divided by a factor of two by frequency divider 55, before being amplified by amplifier 40 and applied to the drive signal port 11 of the RZ modulator.

In addition, rather than amplitude-modulate the RZ drive signal with the relatively low frequency (e.g., 10 kHz), dither signal (as supplied at the NRZ AM dither port 105 in the quadrature bias embodiment of FIG. 1), the architecture of the modulator bias control circuit 100 is modified to add the dithering signal component to the DC bias signal that is coupled to the DC bias port 13 of the upstream RZ modulator 10.

For this purpose, the first output 182 of periodically toggled dither signal-coupling switch 180 is summed by an adder 190 with the DC bias voltage provided by error integrator 149. Namely, the output of adder 190 is the (10 kHz) dither signal riding on the DC bias produced by the integrator 149. This summation signal is coupled to the RZ DC bias output port 101 for application to the DC bias port 13 of the RZ modulator 10.

Figure 5:
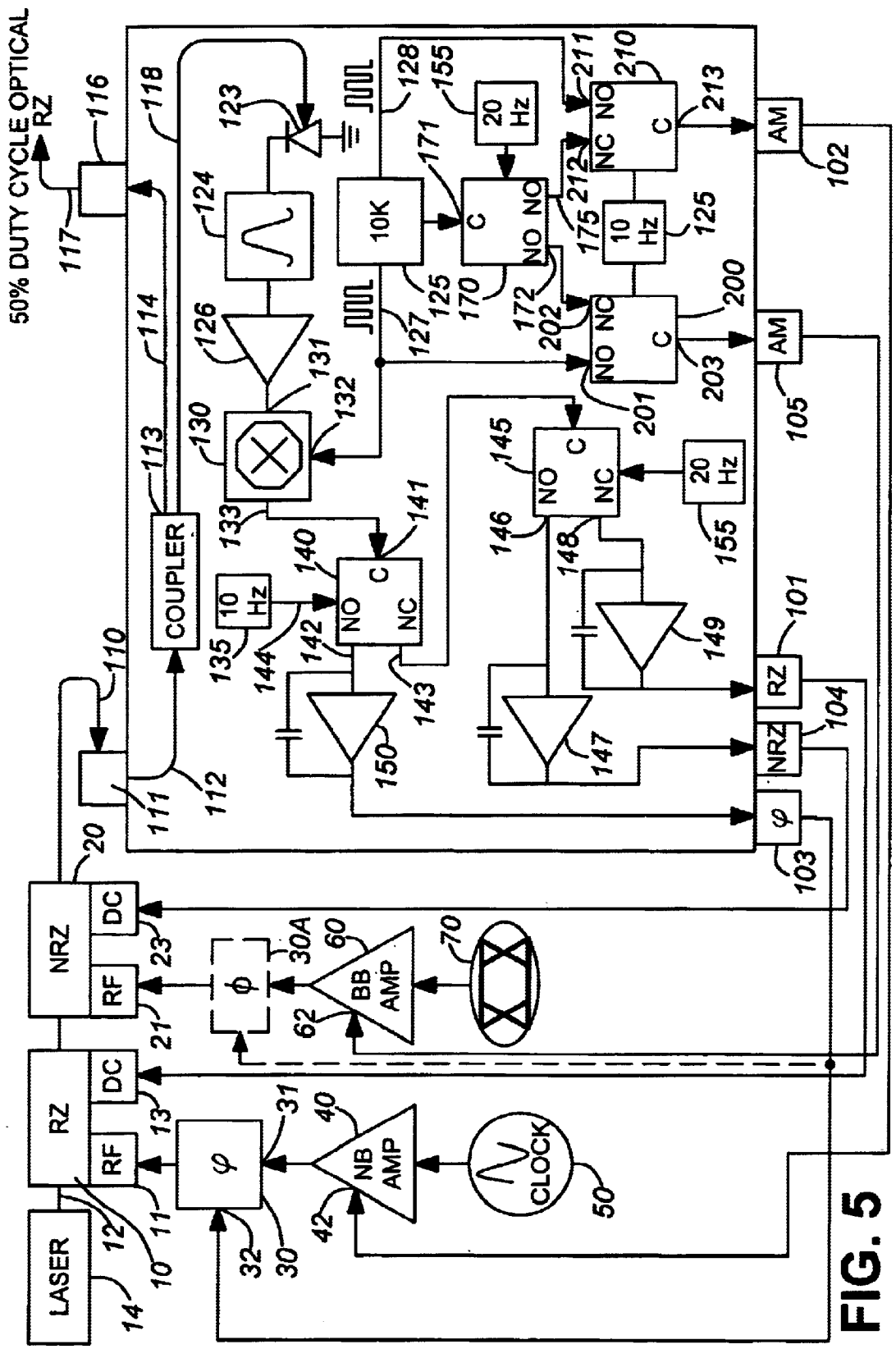
FIG. 5 diagrammatically illustrates a third embodiment of the cascaded RZ/NRZ digital optical transmitter of the present invention, using a dither signal with low modulation index to amplitude modulate the two RF signals needed to create optical RZ data.

FIG. 5 diagrammatically illustrates a third embodiment of the cascaded RZ/NRZ digital optical transmitter of the present invention which employs a modified implementation of the RZ quadrature bias embodiment of FIG. 1, to control the differential phase between the RZ and NRZ RF signals applied to respective RZ and NRZ modulators. As in the embodiment of FIG. 1, the RZ modulator is biased at the mid point of its transfer function, as shown in FIG. 4, so as to realize an RZ duty cycle of 50%. Again, those components of the architecture of the embodiment of FIG. 5 that are the same as in the embodiment of FIG. 1 will not be redescribed here.

The architecture of FIG. 5 differs from FIG. 1 by simultaneously applying two dither signals to the RZ and NRZ modulators, each having the same modulation index (which may be achieved through manual calibration of the modulator set-up, or automatically (under the control of a transmitter system processor)). Also, the resultant phases of the two optical dither signals are 180 degrees out of phase and of equal amplitude. This allows the detection circuitry at the front end of the modulator bias control circuit to be considerably simplified (in particular, it allows a relatively expensive high speed optical detector (such as one designed to detect RF frequencies on the order of 5 GHz or greater) to be replaced by an off-the-shelf low cost component (e.g., a general purpose photodetector capable of detecting frequencies up to 10 to 100 MHz or so).

As long as the RZ clock and NRZ data are aligned in phase, then the two dither signals of equal amplitude and opposite phase will cancel each other, producing no error signal present at the output of the synchronous demodulator in the modulator bias control circuit 100. However, if there a phase misalignment between the RZ and the NRZ data, the optical dither amplitudes at the output of the cascaded modulators will not be of the same amplitude and will not cancel and an error signal will be added to or subtracted from a bias output voltage via the integrator 150. This bias voltage is used to control the electrical phase delay imparted to the RZ or NRZ RF signal.

For this purpose, the high speed photodetector 120 and RF detector 122 at the front end of the modulator bias control circuit 100 are replaced by a substantially reduced cost, general purpose photodetector 123, the output of which is coupled to bandpass filter 124. In addition, rather than dither the phase control port 32 of the RZ phase shifter 30, the gains of the broadband and narrow band amplifiers are simultaneously dithered via their gain control ports 62 and 42, respectively.

In order to produce the pair of equal amplitude, opposite phase dither signals, complementary phase output ports 127 and 128 of the (10 kHz) clock generator 125 are coupled to first inputs 201 and 211, respectively, of toggled 2:1 multiplexers 200 and 210. The outputs 172 and 173 of the toggled dither signal-coupling switch 170 are now coupled to second respective inputs 202 and 212 of these multiplexers (as the switch 180 is also eliminated). The output 203 of multiplexer 200 is coupled to AM dither port 105, while the output 213 of multiplexer 210 is coupled to AM dither port 105, while AM dither port 102.

The embodiment of FIG. 5 operates as follows. The complementary versions of the low frequency (low modulation index) dither signals produced at outputs 127 and 128 of the 10 kHz clock generator 125 are coupled from ports 102 and 105 to the respective narrowband and wideband amplifiers 40 and 60, respectively, so as to amplitude modulate the two RF signals used to produce the composite optical RZ data stream. As pointed out above, the objective is to produce two optical dither signals of equal amplitude and opposite phase when the centers of the RZ pulses are aligned with the centers of the NRZ data. In response to being detected by the photodetector 123 at the optical signal detection front end of modulator bias control circuit 100, the filtered and amplified signal is synchronously demodulated by the synchronous demodulator 130.

If the fundamental dither signal is present, synchronous demodulator 130 produces an error signal. When the RZ clock and NRZ data are aligned in phase, the two dither signals of equal amplitude and opposite phase will cancel and there will be no error signal present at the output of the synchronous demodulator 130, and no error voltage will be added to or subtracted from output of integrator 150 and applied to the control input 32 of RZ phase shifter 30. However, if there is a phase misalignment between the RZ and the NRZ data, then the optical dither amplitudes at the output of the cascaded modulators will not be of the same amplitude and will not cancel. As a result, an error signal will be produced at the output of the synchronous demodulator and added or subtracted by integrator 150 to the coupled phase shift control port 103, for controlling the phase delay imparted to the RZ or NRZ RF signal.

It should also be noted that the embodiment of FIG. 5 may employ an alternative phase shifter, as in the embodiment of FIG. 1, wherein a broadband phase shift component is installed in the output path from the NRZ broadband amplifier to the RF drive signal input of the NRZ modulator. Also, rather than use a single device, the phase shifter may be implemented as separate narrowband and broadband phase shift elements, installed in the output paths of amplifiers 40 and 60, respectively. The choice of implementation again depends upon the designer and application. What is required is that the phase shift mechanism be capable of providing a controllable differential phase offset between the RZ and NRZ RF signals in accordance with the detected error derived by the modulator bias control circuit 100.

As will be appreciated from the foregoing description, using one of several techniques employing the same feedback control, the dither signal-based feedback bias control mechanism of the present invention is able to control the bias points of the cascaded RZ and NRZ modulators, as well as to align the phase of the optical RZ clock with the optical NRZ data. As in the first approach, the second approach may be implemented using either an RZ quadrature AM dither or an RZ "hillclimber" bias dither. The second technique is an RZ quadrature AM dither or an RZ "hillclimber" bias dither scheme that applies equal amplitude and opposite phase opticaldither signals to perform complementary modulation of both the RZ and NRZ modulators simultaneously. This method allows standard off-the-shelf electronics and feedback control techniques to be married with existing electro-optic modulator bias control circuitry with minimal complexity.

It can be seen therefore that the invention reduces the complexity of the RZ transmitter and makes the use of RZ data formats in deployed systems more viable. It also facilitates installing RZ pulse generators and data modulators and other high bit rate fiber optic transmission equipment into high data rate networks, while allowing the use of compact low power electronics and a denser level of optical and electronic integration per module.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. An optical modulator architecture, for use in an optical communication system, comprising:
a multiple optical modulator arrangement including a pair of optical modulators coupled in cascade in the output light path of a laser, wherein a first optical modulator has a return-to-zero RZ RF signal modulation port to which a sinusoidal RF clock signal from a narrowband modulator driver is coupled, and a DC bias port to which a DC bias therefor is coupled, and wherein a second optical modulator optically has a non-return-to-zero (NRZ) RF signal modulation port to which an NRZ signal from a broadband modulator driver is coupled, and a DC bias port to which a DC bias therefor is coupled;
an optical detector coupled to monitor composite NRZ-RZ modulated light produced by said multiple optical modulator arrangement; and a modulator bias control circuit which is operative to impress dithering signal modulation upon said NRZ-RZ modulated light, and to control bias points of the modulators and phase delay of an electrical phase shifter in a manner that aligns the phase of said optical RZ signal with that of said optical NRZ signal, based upon detected dither signal energy in an output of said optical detector.

2. The optical modulator architecture according to claim 1, including at least one controllable phase shift circuit coupled to shift the phase of at least one of said RZ signal applied to the RZ signal modulation port of said first optical modulator and said NRZ signal applied to the NRZ signal modulation port of said second optical modulator, in accordance with an associated phase control signal therefor as generated by said modulator bias control circuit based upon said dithering signal energy in said output of said optical detector.

3. The optical modulator architecture according to claim 1, wherein said modulator bias control circuit is operative to impress equal amplitude and opposite phase optical dither signals upon said RZ and NRZ signals, so as to effect simultaneous complementary modulation of said RZ and NRZ signals modulated onto said laser light by said first and second optical modulators.

4. The optical modulator architecture according to claim 1, wherein said modulator bias control circuit is operative to effect an RZ quadrature AM dither of said RF sinusoidal signal coupled to said first optical modulator.

5. The optical modulator architecture according to claim 1, wherein said modulator bias control circuit is operative to effect a "hillclimber" bias dither of said RZ bias signal coupled to said first optical modulator.

6. The optical modulator architecture according to claim 2, wherein said optical detector comprises a high speed optical detector coupled to an RF detector that is operative to provide an electrical output representative of dithering signal energy in said composite NRZ-RZ modulated light produced by said multiple optical modulator arrangement.

7. The optical modulator architecture according to claim 6, wherein said RF detector is operative to provide an output containing said dither signal when the phases of said RZ and NRZ signals are not aligned, the output of said RF detector being coupled to a synchronous demodulator, which produces an error signal representative of misalignment of said phases of said RZ and NRZ signals, and wherein said modulator bias control circuit is operative to combine said error signal with a bias signal to realize a phase control signal to be coupled to said at least one controllable phase shift circuit.

8. The optical modulator architecture according to claim 2, wherein said optical detector is operative to provide an electrical output representative of dithering signal energy in said composite NRZ-RZ modulated light produced by said multiple optical modulator arrangement.

9. The optical modulator architecture according to claim 8, wherein said modulator bias control circuit is operative to impress equal amplitude and opposite phase dither signals upon said RZ and NRZ signals, so as to effect simultaneous complementary modulation of said RZ and NRZ signals modulated onto said laser light output by said first and second optical modulators, and wherein said optical detector is operative to provide an output containing said dither signal when the phases of said RZ and NRZ signals are not aligned, the output of said optical detector being coupled to a synchronous demodulator, which produces an error signal representative of misalignment of said phases of said RZ and NRZ signals, and wherein said modulator bias control circuit is operative to supply a phase control signal containing said error signal to said least one controllable phase shift circuit.

10. An optical modulator architecture for use in an optical communication system comprising first and second optical modulators optically coupled in cascade to receive and modulate an optical beam with a composite RF signal waveform containing return-to-zero RZ signal modulation and non-return-to-zero modulation, and being biased by a feedback loop is effective to align the phase, of said RZ modulation with that of said NRZ modulation, and wherein said feedback loop is operative to impress equal amplitude and opposite phase dither signals upon said RZ and NRZ modulations, so as to effect simultaneous complementary amplitude modulation of said RZ and NRZ modulations of said light beam by said first and second optical modulators.

11. An optical modulator architecture for use in an optical communication system comprising first and second optical modulators optically coupled in cascade to receive and modulate an optical beam with a composite RF signal waveform containing return-to-zero RZ signal modulation and non-return-to-zero modulation, and being biased by a feedback loop is effective to align the phase of said RZ modulation with that of said NRZ modulation, and wherein said feedback loop includes a modulator bias control circuit that is operative to effect an RZ quadrature phase dither of an RZ signal coupled to said first optical modulator.

12. An optical modulator architecture for use in an optical communication system comprising first and second optical modulators optically coupled in cascade to receive and modulate an optical beam with a composite RF signal waveform containing return-to-zero RZ signal modulation and non-return-to-zero modulation, and being biased by a feedback loop is effective to align the phase of said RZ modulation with that of said NRZ modulation, and wherein said feedback loop includes a modulator bias control circuit that is operative to effect a hillclimber phase dither of an RZ signal coupled to said first optical modulator.

13. The optical modulator architecture according to claim 12 wherein said feedback loop includes a high speed optical detector coupled to an RF detector that is operative to provide an electrical output representative of dithering signal energy in said optical light as modulated with said composite RF signal waveform.

14. The optical modulator architecture according to claim 13, wherein said feedback loop includes an RF detector that is operative to provide an output containing said dithering signal when the phases of said RZ and NRZ signals are not aligned, the output of said RF detector being coupled to a synchronous demodulator, which produces an error signal representative of misalignment of said phases of said RZ and NRZ signals, and wherein said feedback loop includes an modulator bias control circuit that is operative to combine said error signal with a bias signal to realize a phase control signal to be coupled to said controllable phase shift circuit.

15. A method of controlling the operation of an optical modulator architecture having first and second optical modulators optically coupled in cascade to receive and modulate a CW laser output with a composite RF signal waveform containing return-to-zero RZ signal modulation and non-return-to-zero modulation, said method comprising the steps of:

(a) impressing a dithering signal upon said RZ and NRZ modulations; and (b) monitoring said CW laser output as modulated with said composite RF signal waveform and aligning the phase of said RZ modulation with that of said NRZ modulation based upon the presence of dithering signal energy in said monitored CW laser output.

16. The method according to claim 15, wherein step (b) comprises shifting the phase of one of an RZ signal applied to an RZ signal modulation port of said first optical modulator and an NRZ signal applied to a NRZ signal modulation port of said second optical modulator, based upon the presence of dithering signal energy in said monitored CW laser output.

17. The method according to claim 15, wherein step (a) comprises impressing equal amplitude and opposite phase dither signals upon said RZ and NRZ modulations, so as to effect simultaneous complementary modulation of said RZ and NRZ modulations of said light by said first and second optical modulators.

* * * * *